United States Patent [19]
Ohnishi et al.

[11] Patent Number: 5,291,323
[45] Date of Patent: Mar. 1, 1994

[54] LIQUID CRYSTAL DISPLAY DEVICE WITH POSITIVE AND NEGATIVE COMPENSATING FILMS EACH WITH ITS OPTICAL AXIS PARALLEL TO THE SURFACE

[75] Inventors: Hiroshi Ohnishi, Nara; Toshiyuki Yoshimizu, Ikoma; Yumi Yoshimura, Yamatokoriyama; Keiko Kishimoto, Osaka, all of Japan

[73] Assignee: Sharp Kabushiki Kaisha, Osaka, Japan

[21] Appl. No.: 769,922

[22] Filed: Sep. 30, 1991

[30] Foreign Application Priority Data

Oct. 1, 1990 [JP] Japan .................. 2-264684

[51] Int. Cl.$^5$ .......................................... G02F 1/1335
[52] U.S. Cl. ............................................. 359/73
[58] Field of Search ................................ 359/73

[56] References Cited

FOREIGN PATENT DOCUMENTS

| | | |
|---|---|---|
| 0367288 | 5/1990 | European Pat. Off. ........... 359/73 |
| 372973A2 | 6/1990 | European Pat. Off. . |
| 379315A3 | 7/1990 | European Pat. Off. . |
| 0382460 | 8/1990 | European Pat. Off. . |
| 424951A1 | 5/1991 | European Pat. Off. . |
| 1-304423 | 12/1989 | Japan . |
| 2-59702 | 2/1990 | Japan . |
| 2-256021 | 10/1990 | Japan . |
| 2-304417 | 12/1990 | Japan . |
| 0013917 | 1/1991 | Japan ........................... 359/73 |
| 9016006 | 12/1990 | World Int. Prop. O. ........... 359/73 |

OTHER PUBLICATIONS

Patent Abstracts of Japan, vol. 14, No. 415 (Sep. 7, 1990), abstract of JP2-160204 (Jun. 20, 1990).

Fumio Ide and Hiroshi Terada, "Optical fiber and Optical Material", Kyouritsu Shuppan Press, 1989. (Japanese article and English translation).

*Primary Examiner*—William L. Sikes
*Assistant Examiner*—Anita Pellman Gross
*Attorney, Agent, or Firm*—David G. Conlin; Linda M. Buckley

[57] ABSTRACT

In a liquid crystal display device using uniaxially drawn polymer film as a phase difference plate, as the elevation angle becomes wider, the difference between the retardation of the phase difference plate and the retardation of the liquid crystal display panel becomes larger, and the optical compensation relation is broken, and the viewing angle becomes narrower. To solve this problem, uniaxially drawn polymer films are prepared separately from polycarbonate and polystyrene which differ in the optical properties, and they are disposed as the optical compensation plate at the front side and back side of a liquid crystal cell, or they are laminated and disposed at the front side and back side of a liquid crystal cell.

7 Claims, 12 Drawing Sheets

- DRAWING DIRECTION
- DIRECTION ORTHOGONAL TO DRAWING DIRECTION

VIEWING ANGLE 12:00

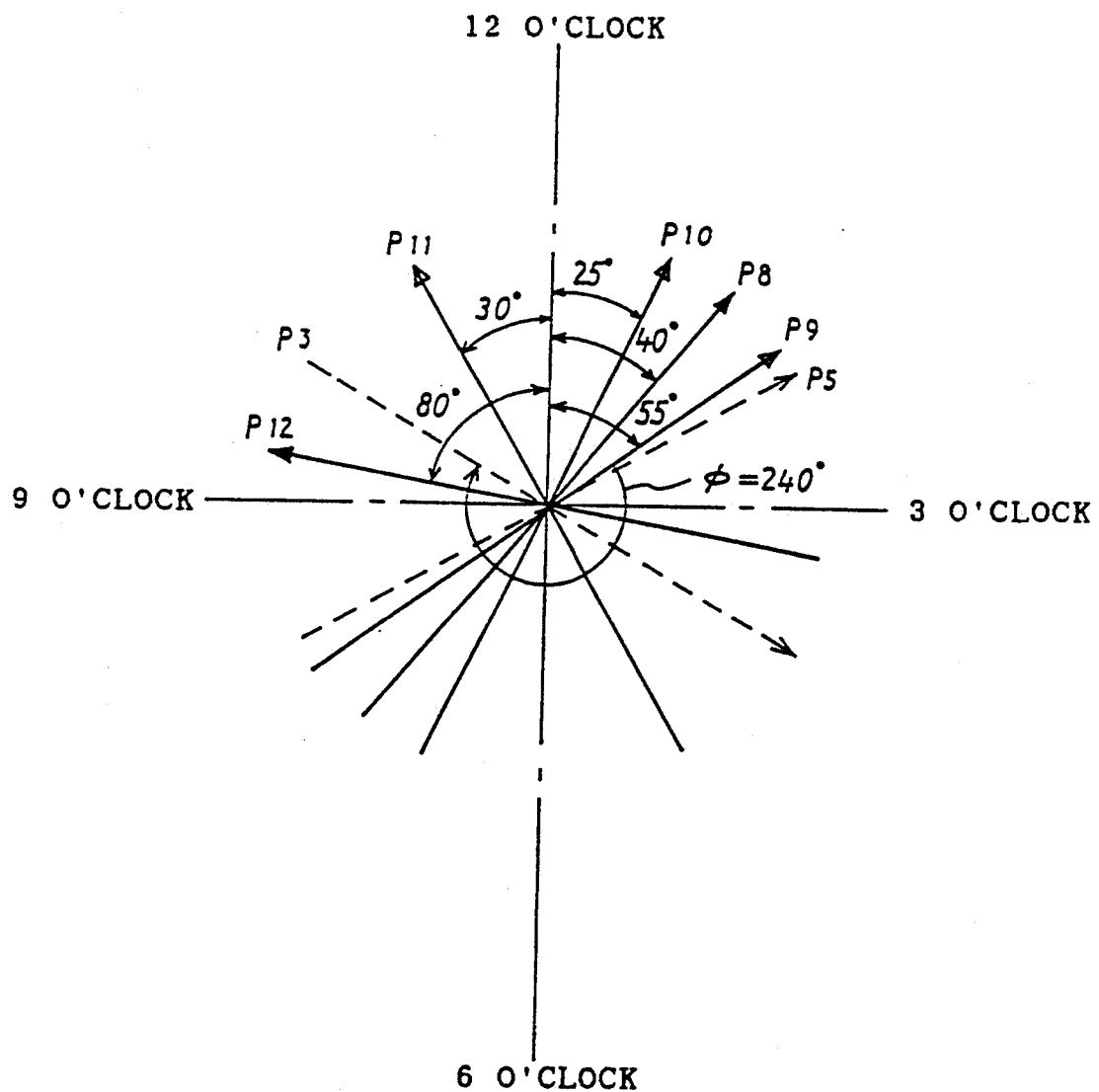

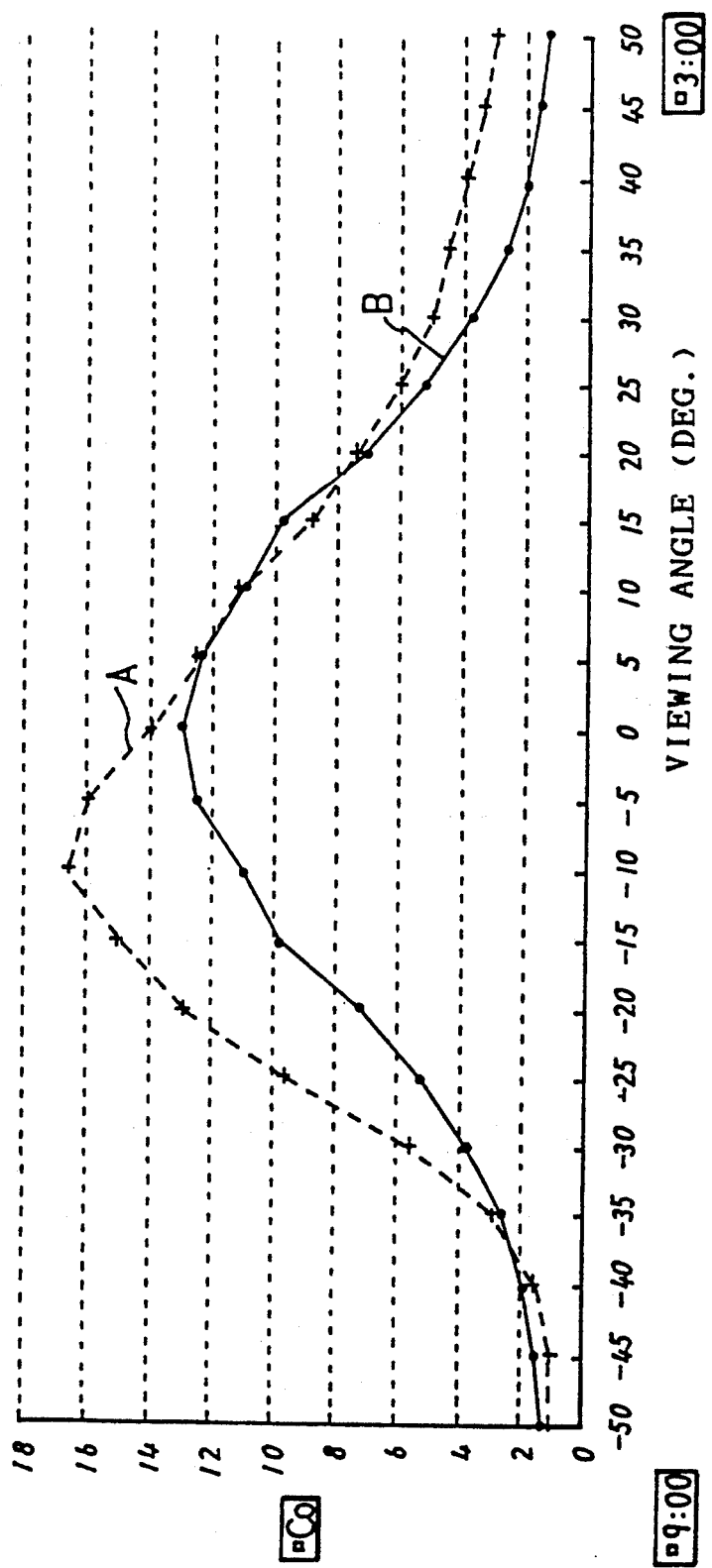

LIQUID CRYSTAL DISPLAY DEVICE WITH POSITIVE AND NEGATIVE COMPENSATING FILMS EACH WITH ITS OPTICAL AXIS PARALLEL TO THE SURFACE

BACKGROUND OF THE INVENTION

1. Field of the Invention

The present invention relates to a liquid crystal display device with a color compensation function by having liquid crystal molecules oriented by twisting 90 degrees or more (supertwisted) as a display medium.

2. Description of the Prior Art

Generally a supertwisted nematic (STN) liquid crystal display device is colored in yellow-green or blue color, but the color is corrected by using an optical compensating plate and a bright and sharp black/white display is obtained. Accordingly, the display quality is enhanced, and it can be used as the display element for a word processor, a computer and other business machines.

As the color-compensated supertwisted liquid crystal display device, a two-layer supertwisted liquid crystal display device is known well, in which the coloring occurring in the first layer (a driving panel) is corrected in the second layer (optical compensating panel) to realize a colorless display. This structure requires two liquid crystal panels, as compared with the single-layer supertwisted liquid crystal display device, and the thickness of the display device increases, which adds to the weight. To solve this problem, using a phase difference plate composed of a uniaxially drawn polymer film as the optical compensating plate, a thin and light-weight supertwisted liquid crystal display device has been developed. This phase difference plate is, however, manufactured by drawing a polymer film, and differs in the optical properties between the film drawing direction and its orthogonal direction, and therefore as compared with the two-layer supertwisted liquid crystal display device, the color change due to the azimuth or elevation angle is larger in the supertwisted liquid crystal display device of phase difference plate type; that is, the viewing angle is narrower.

It is because of its optical anisotropy that a uniaxially drawn polymer film is used as a phase difference plate. That is, between the polymer film drawing direction and its orthogonal direction, the refractive index is different (birefringence). The retardation ($\Delta n \cdot d$) given by the product of this refractive anisotropy $\Delta n$ and the film thickness d is a physical quantity that brings about phase difference of the light occurring when passing through the film, and the change of this due to elevation angle differs between the drawing angle and its orthogonal direction. For example, in a phase difference plate made of polycarbonate, as the elevation angle becomes larger, the retardation decreases in the drawing direction and increases in the orthogonal direction. As a result, when combined with a liquid crystal display panel, if the optical compensation relation is perfect in the normal direction, as the elevation angle becomes larger, the difference between the retardation of the phase difference plate and the retardation of the liquid crystal panel becomes larger, and the optical compensation relation collapses. In other words, a color change occurs, and the contrast ratio is lowered, and therefore the viewing angle is narrowed.

SUMMARY OF THE INVENTION

It is hence a primary object of the invention to solve such problems and to present a liquid crystal display device of thin and light-weight, capable of obtaining a sharp black/white display and a wide viewing angle.

As a result of studies of various polymer materials usable as phase difference plates, it is found out that the polymer film manufactured by uniaxially drawing polystyrene is usable as a phase difference plate, and is capable of almost eliminating the retardation changes due to elevation angle and azimuth in combination with the polycarbonate generally used hitherto as the phase difference plate. As the elevation angle becomes larger, the polycarbonate decreases in retardation in the drawing direction, while retardation increases in the orthogonal direction. Polystyrene has a similar tendency, but since the slow phase axis is in the direction orthogonal to the drawing direction, unlike polycarbonate, and when both are disposed by matching the slow phase axes, the drawing directions cross with each other, and the retardation change due to elevation angle is canceled. When phase difference plates made of these two materials are disposed in the STN liquid crystal display as optical compensation plates, the optical compensation relation satisfied in the normal direction is kept constant if the elevation angle or azimum varies, so that a liquid crystal display device of a wide viewing angle, small in changes of contrast ratio and color tone is obtained.

It is because of its optical anisotropy that the uniaxially drawn polymer film is used as phase difference plate. That is, it is intended to make use of the property that the refractive index in the drawing direction is different from the refractive index in its orthogonal direction. The relative phase difference of the light passing through the liquid crystal display panel (ordinary light beam and extraordinary light beam) is either canceled or aligned in phase in the entire wave-length by the product, that is, the retardation, of its refractive anisotropy $\Delta n$ and film thickness d when passing through the phase difference plate. This is, however, true when the display device is seen from the normal direction, and it is necessary to consider also the case of seeing from the oblique direction, that is, the three-dimensional refractive index of the phase difference plate when applying viewing angle characteristics. Supposing the refractive index of the phase difference plate in the three-dimensional direction to be $N_{MD}$ (drawing direction), $N_{TD}$ (the direction orthogonal to drawing direction), and $N_{ZD}$ (thickness-wise direction), the refractive anisotropy and retardation as seen from the drawing direction and its orthogonal direction are given as follows, assuming the elevation angle from the normal direction of the phase difference plate to be $\Psi$.

(1) As seen from the drawing direction

Refractive anisotropy $\Delta N_{MD} = \{N^2_{MD} N^2_{ZD}/(N^2_{MD} \sin^2\Psi + N^2_{ZD} \cos^2\Psi)\}^{\frac{1}{2}} - N_{TD}$ Phase difference $R_{MD} = \Delta N_{MD} \cdot d/\cos\Psi$ (2) As seen from the direction orthogonal to drawing direction Refractive anisotropy $\Delta N_{TD} = N_{MD} - \{N_{TD}^2 N_{ZD}^2/(N_{TD}^2 \sin^2\Psi + N_{ZD}^2 \cos^2\Psi)\}^{\frac{1}{2}}$ Phase difference $R_{MD} = \Delta N_{TD} \cdot d/\cos\Psi$ Measuring the refractive indices in the three-dimensional direction and putting in the above equations, the results will be as shown in FIG. 1. It is known therefrom that the retardation decreases in the drawing direction of the phase difference plate, and tends to increase in the direction orthogonal to the drawing direction. In the case of polycarbonate which is a typical phase difference plate, changes of retardation due to elevation angle were actually measured by the method proposed by Sénarmon, of which results are shown in FIG. 2. The results coincided with the tendency obtained from the theoretical formula above.

From FIG. 2, the change of each elevation angle by azimumth was determined, and FIG. 3 was obtained. Likewise, results of determining the retardation changes due to azimuth and elevation angle of the liquid crystal display panel are shown in FIG. 4. When the display device combining such phase difference plate and liquid crystal display panel is seen obliquely, the tendency of change of retardation is different from each other, and the optical compensation relation is broken, and light leak or color change occurs, and the contrast ratio is lowered, and the viewing angle becomes narrower. Therefore, in order to extend the viewing angle, it is necessary to reduce the retardation changes due to the elevation angle of the phase difference plate.

In the invention, in order to reduce the retardation changes due to elevation angle of the polycarbonate phase difference plate, it is another feature that the polymer film fabricated by uniaxially drawing the polystyrene is combined as the phase difference plate. Polycarbonate and polystyrene have benzene ring in their skeleton, but polycarbonate contains the benzene rings in the direction of the principal chain of polymer, while polystyrene has its benzene rings in the direction of the side chain, so that the optical property of the film fabricated by drawing uniaxially is different. Polycarbonate has the maximum refractive index $N_{MD}$ in the drawing direction and has the slow phase axis in this direction, while polystyrene has the maximum refractive index $N_{TD}$ in the direction orthogonal to the drawing direction, and has the slow phase axis in this direction. Therefore, in the liquid crystal display device having the polycarbonate phase difference plate disposed on the front and rear sides of the panel, when replaced with the polystyrene phase difference plate while maintaining the slow phase axis configuration, the viewing angle characteristic is rotated by 90 degrees in the liquid crystal display device. Accordingly, when the polycarbonate phase difference plate is disposed at one side and the polystyrene phase difference plate on the other side, the drawing directions are orthogonal to each other, and the retardation changes due to elevation angle and azimuth are canceled with each other, and the optical compensation relation with the liquid crystal panel satisfied in the normal direction is maintained if the elevation angle is larger, so that a liquid crystal display device of wide viewing angle without change in contrast ratio and color tone may be obtained.

The invention hence realizes a black and white display device of high contrast and wide viewing angle, by mutually canceling the retardation changes due to elevation angle by combining a polycarbonate phase difference plate and a polystyrene phase difference plate, and eliminating the shortcomings of color tone changes due to elevation angle and narrowness of viewing angle due to the phenomenon of reversal of black and white display experienced in the conventional black and white liquid crystal display device of a phase difference plate system. In particular, the invention is outstandingly effective in a display of high definition and large size, such as 1024×768 dots, and 1120×800 dots, and it is possible to extend to a work station or the like. Besides, since the black and white display is stable, display color changes due to viewing angle are minimized also in the color display, so that the display quality may be immensely improved.

BRIEF DESCRIPTION OF THE DRAWINGS

Other and further objects, features, and advantages of the invention will be more explicit from the following detailed description taken with reference to the drawings wherein:

FIG. 6, FIG. 8 and FIG. 13 are diagrams showing the configuration conditions of members in individual embodiments.

FIG. 7, FIG. 9, FIG. 11, and FIG. 14 are comparative diagrams of viewing angle and contrast characteristic in embodiments and prior art, all showing the characteristics in 1/240 duty driving.

DETAILED DESCRIPTION OF THE PREFERRED EMBODIMENTS

Figure 1:
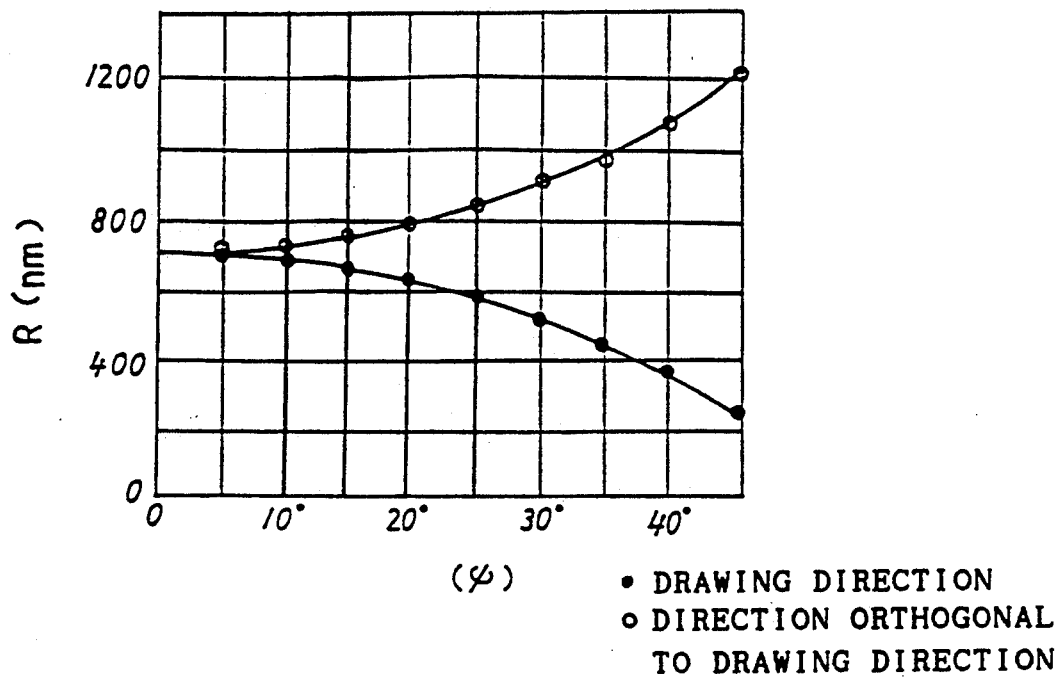
FIG. 1 is a characteristic diagram showing the relation between the retardation value R and elevation angle obtained by putting the three-dimensional refractive index to the theoretical formula expressing the retardation changes due to elevation angle presented for explanation of the invention.
Figure 2:
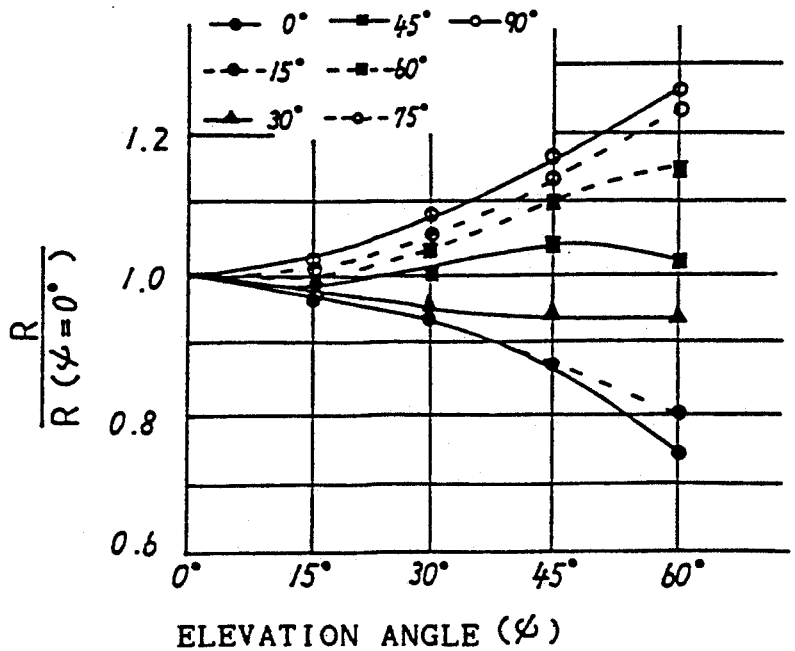
FIG. 2 is a diagram showing retardation changes due to elevation angle measured on polycarbonate phase difference plate.
Figure 3:
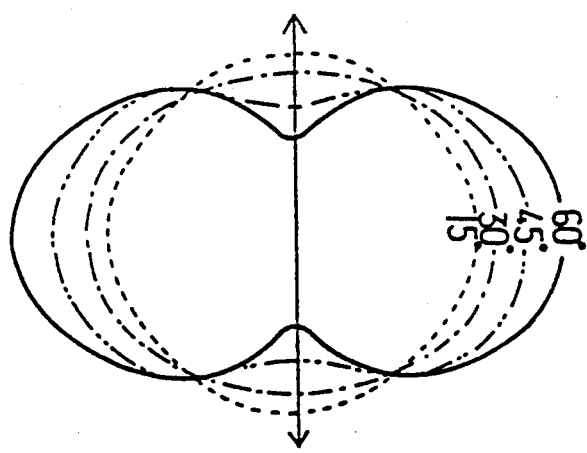
FIG. 3 is a diagram showing the change rate of retardation in all directions of the polycarbonate phase difference plate obtained from FIG. 2, in which the arrow denotes the drawing direction.
Figure 4:
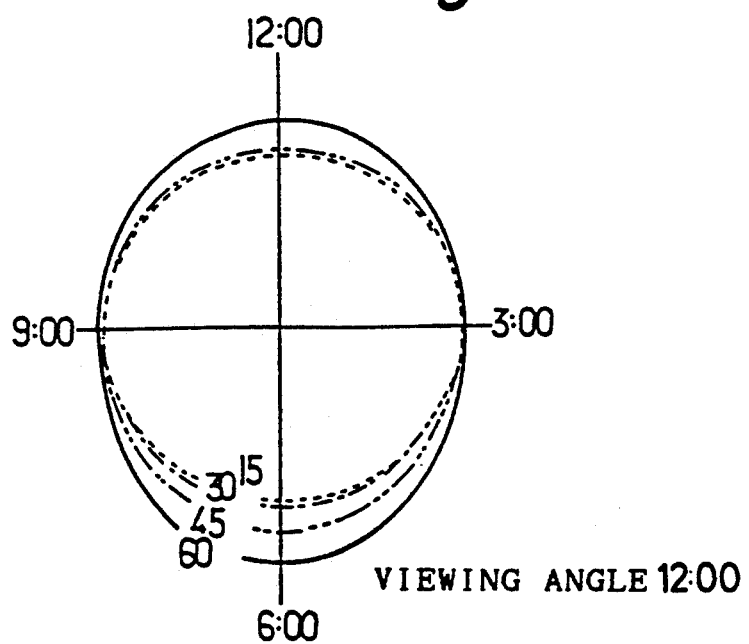
FIG. 4 is a characteristic diagram showing the change rate of retardation in all directions of the STN liquid crystal display panel (240-degree twisted).

Now referring to the drawing, preferred embodiments of the invention are described below.

Embodiment 1

Figure 5:
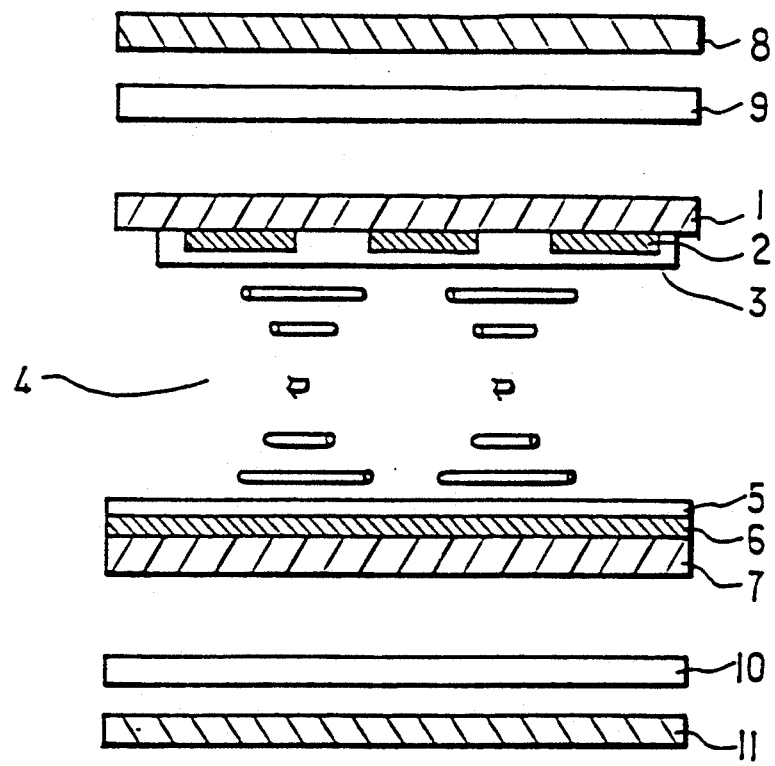
FIG. 5, FIG. 10, and FIG. 12 are sectional views of liquid crystal display device in individual embodiments of the invention.
Figure 6:
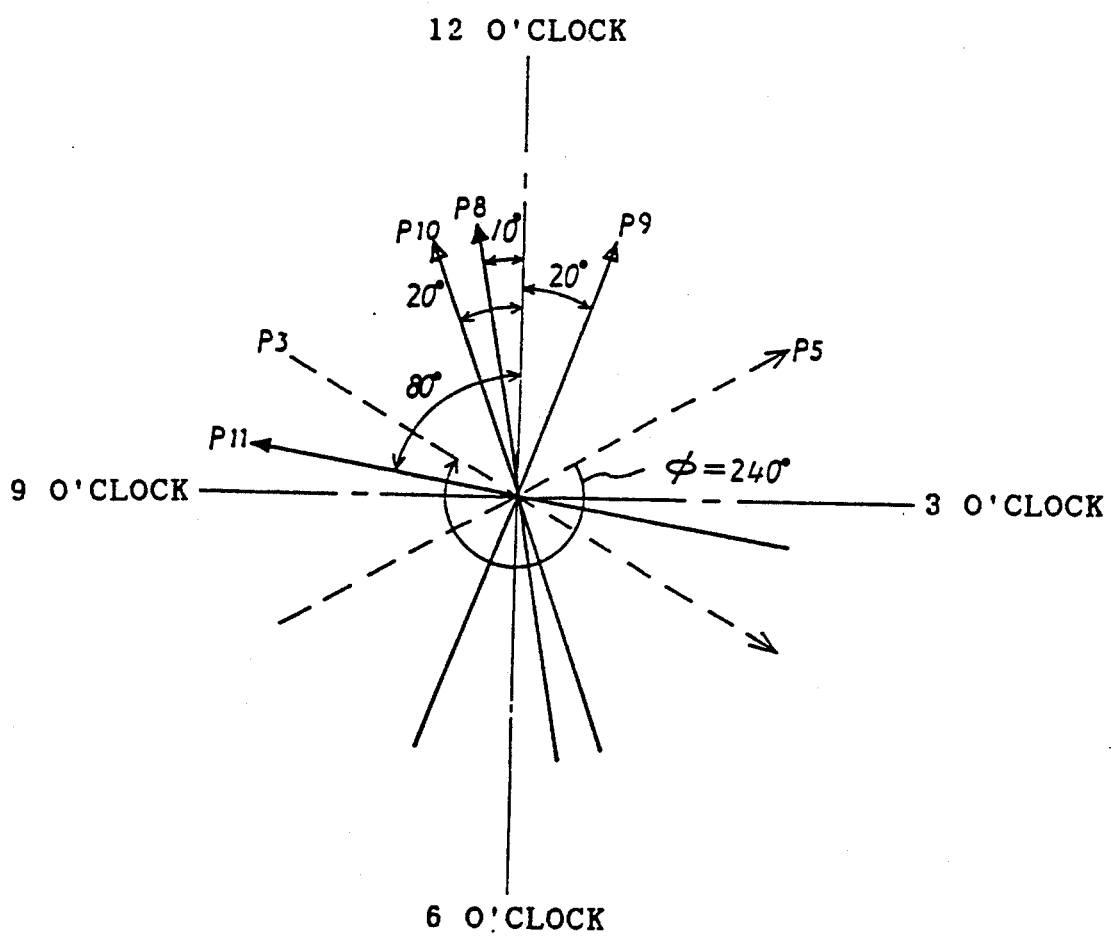
Figure 7:
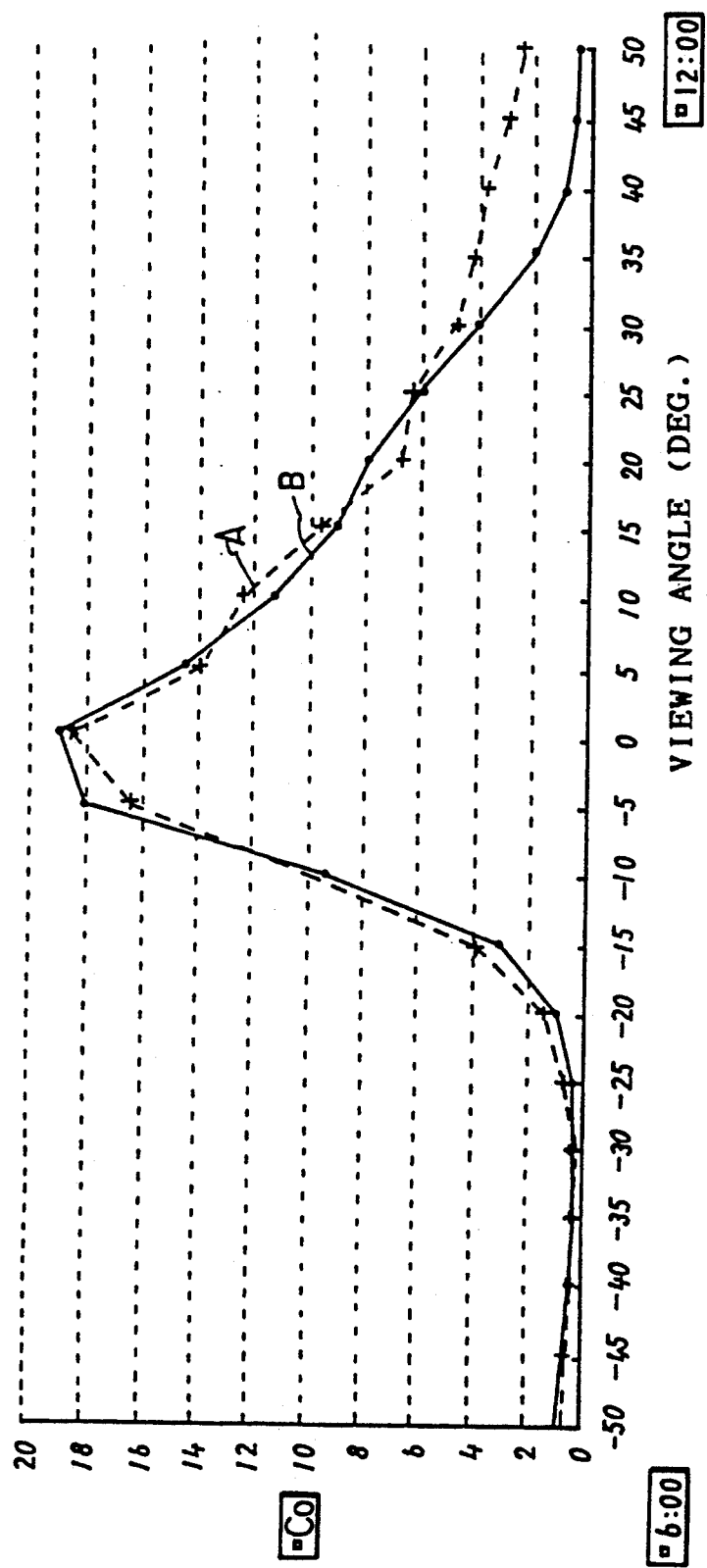

FIG. 5 shows an exploded sectional view of a liquid crystal display device in an embodiment of the invention. Numerals 8, 11 are polarizers, being of neutral gray type with the independent transmittance of 42% and degree of polarization of 99.99%, 9 is the front side of the optical compensation plate comprising a polystyrene phase difference plate with the retardation value of 420 nm, 10 is the back side of the optical compensation plate comprising a polycarbonate phase difference plate with the retardation value of 420 nm, and 1, 7 are glass substrates on which transparent electrodes ITO 2, 6 are formed. Furthermore, organic orientation films, 3, 5 are formed thereon, and rubbing orientation is treated so that a liquid crystal layer 4 may be twisted by 240 degrees. As the liquid crystal material for the liquid crystal layer 4, a nematic liquid crystal having a positive dielectric anisotropy is used, for example, a mixed liquid crystal adding 1.45 wt. % of cholesterylnonanoate (CN) as chiral dopant in order to define the twisting direction to phenylcyclohexane (PCH) liquid crystal. The refractive anisotropy Δn of mixed liquid crystal is 0.123, and the thickness of the liquid crystal layer 4 is set at 7.5 μm. FIG. 6 shows a drawing for showing the orientation condition of members in this embodiment. In the drawing, P8 is the absorption axis direction of the face side polarizer, P9 is the slow phase axis direction of the polystyrene phase difference plate, and P3, P5 are liquid crystal molecule orientation axis (rubbing axis) of the upper side glass substrate and lower side glass substrate, being twisted by 240 degrees in the clockwise direction. Moreover, P10 is the slow phase axis direction of the polycarbonate phase difference plate, and P11 is the absorption axis direction of the lower side polarizer. FIG. 7 is a viewing angle-contrast characteristic diagram as seen on the flat plane including the 12 o'clock-6 o'clock direction of this embodiment and the prior art. Characteristic curve A denotes this embodiment, and characteristic curve B represents the prior art. When compared in the viewing angle range where the contrast ratio Co is 4.0 or more, it is 44 degrees in the prior art and 55 degrees in this embodiment, being expanded about 1.25 times. The prior art cited herein is a configuration of polycarbonate phase difference plate disposed each on the face and back side of the STN liquid crystal display panel.

Embodiment 2

Figure 8:
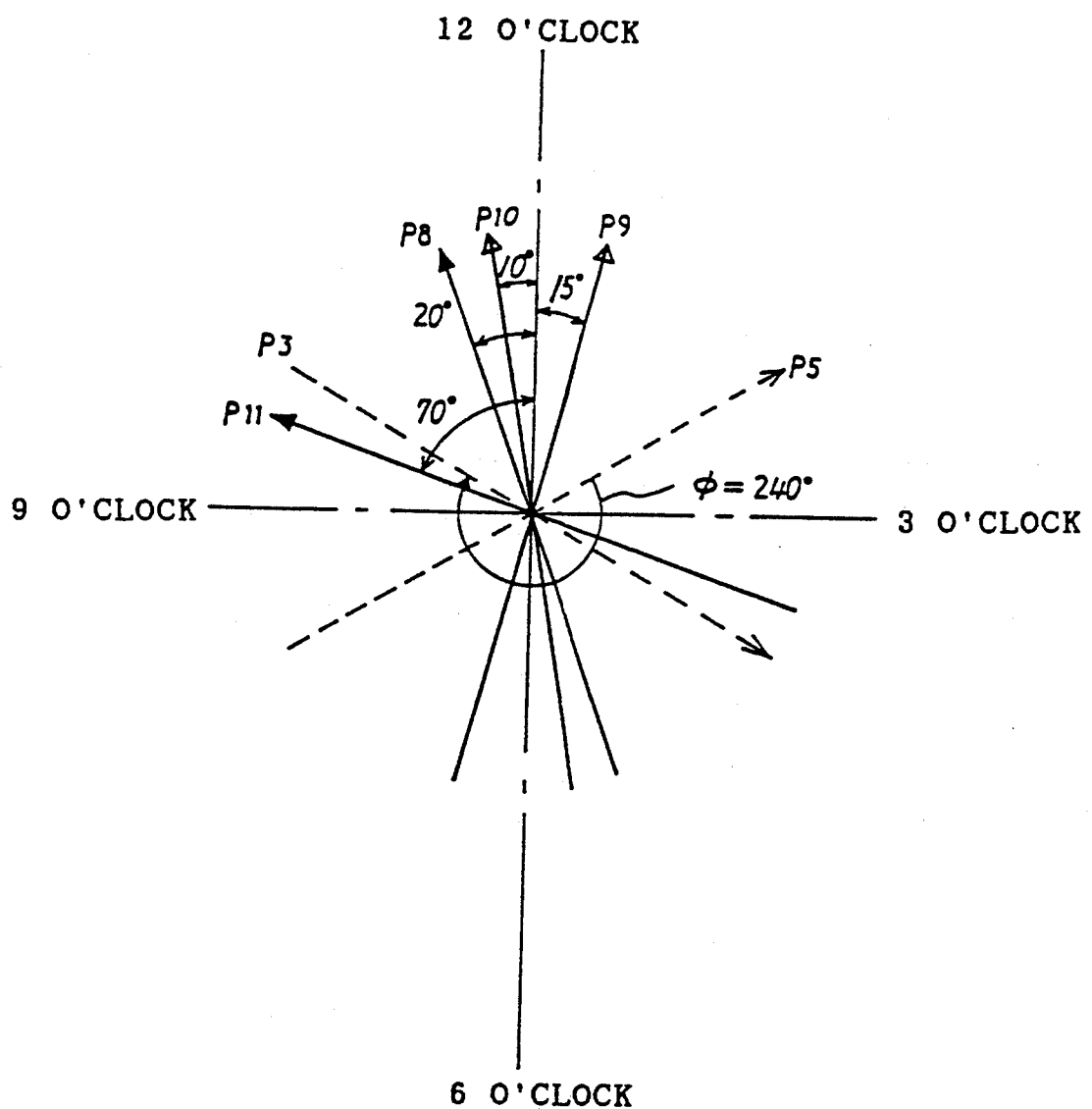

FIG. 5 is an exploded sectional view of a liquid crystal display device in other embodiment of the invention. Numerals 8, 11 are polarizers, being of neutral gray type with the independent transmittance of 42% and degree of polarization of 99.99%, 9 is the front side of the optical compensation plate comprising a polycarbonate phase difference plate with the retardation value of 420 nm, 10 is the back side of the optical compensation plate comprising a polystyrene phase difference plate with the retardation value of 420 nm, and 1, 7 are glass substrates, on which transparent electrode (ITO) 2, 6 are formed. Furthermore, organic orientation films 3, 5 are formed thereon the rubbing orientation is treated so that a liquid crystal layer 4 may be twisted by 240 degrees. As the liquid crystal material of the liquid crystal layer 4, a nematic liquid crystal having a positive dielectric anisotropy is used, for example, a mixed liquid crystal adding 1.77 wt. % of cholesterylnonanoate (CN) as chiral dopant in order to define the twisting direction to phenylcychlohexane (PCH) liquid crystal. The refractive anisotropy Δn of the mixed liquid crystal is 0.125, and the thickness of the liquid crystal layer 4 is set at 7.5 μm. FIG. 8 shows the orientation condition of the members in this embodiment. In the diagram, P8 is the absorption axis direction of the face side polarizer, P9 is the slow phase axis direction of polycarbonate phase difference plate, and P3, P5 are liquid crystal molecule orientation axis (rubbing axis) of the upper side glass substrate and lower side glass substrate, being twisted by 240 degrees in the clockwise direction. Moreover, P10 is the slow phase axis direction of the polystyrene phase difference plate, and P11 is the absorption axis direction of the lower side polarizer.

Figure 9:
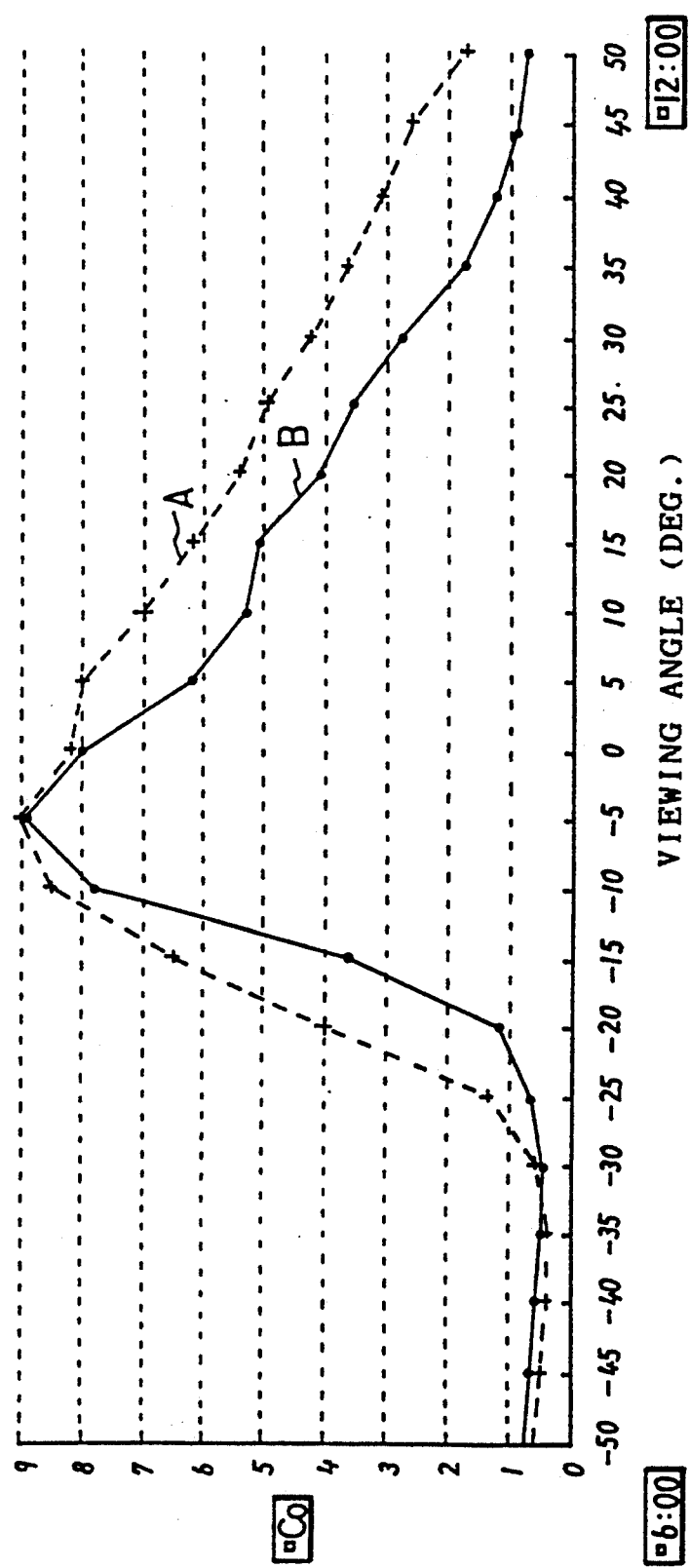

FIG. 9 is a viewing angle-contrast characteristic diagram as seen on the flat plane including the 12 o'clock-6 o'clock direction of this embodiment and the prior art. Characteristic curve A denotes this embodiment, and characteristic curve B represents the prior art. When compared in the viewing angle range in which the contrast ratio Co is 4.0 or more, it is 35 degrees in the prior art and 52 degrees in this embodiment, being extended about 1.5 times. The prior art refers to a configuration of polycarbonate phase difference plate disposed each on the face and back side of the STN liquid crystal display panel.

Embodiments 3

Figure 10:
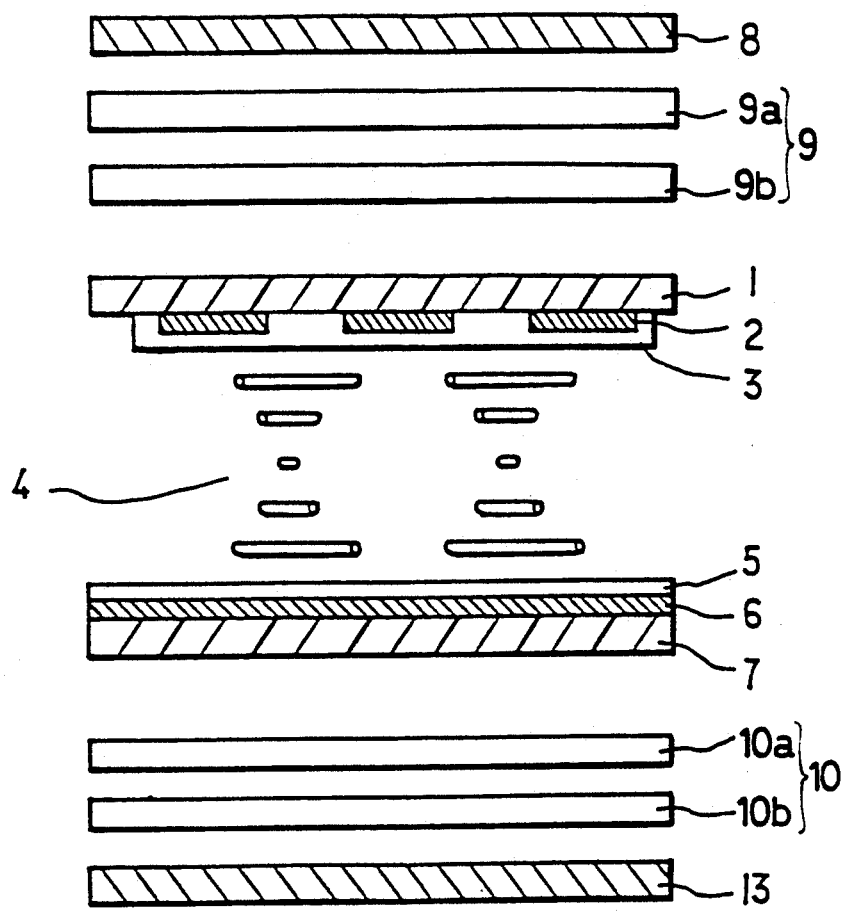
Figure 11:
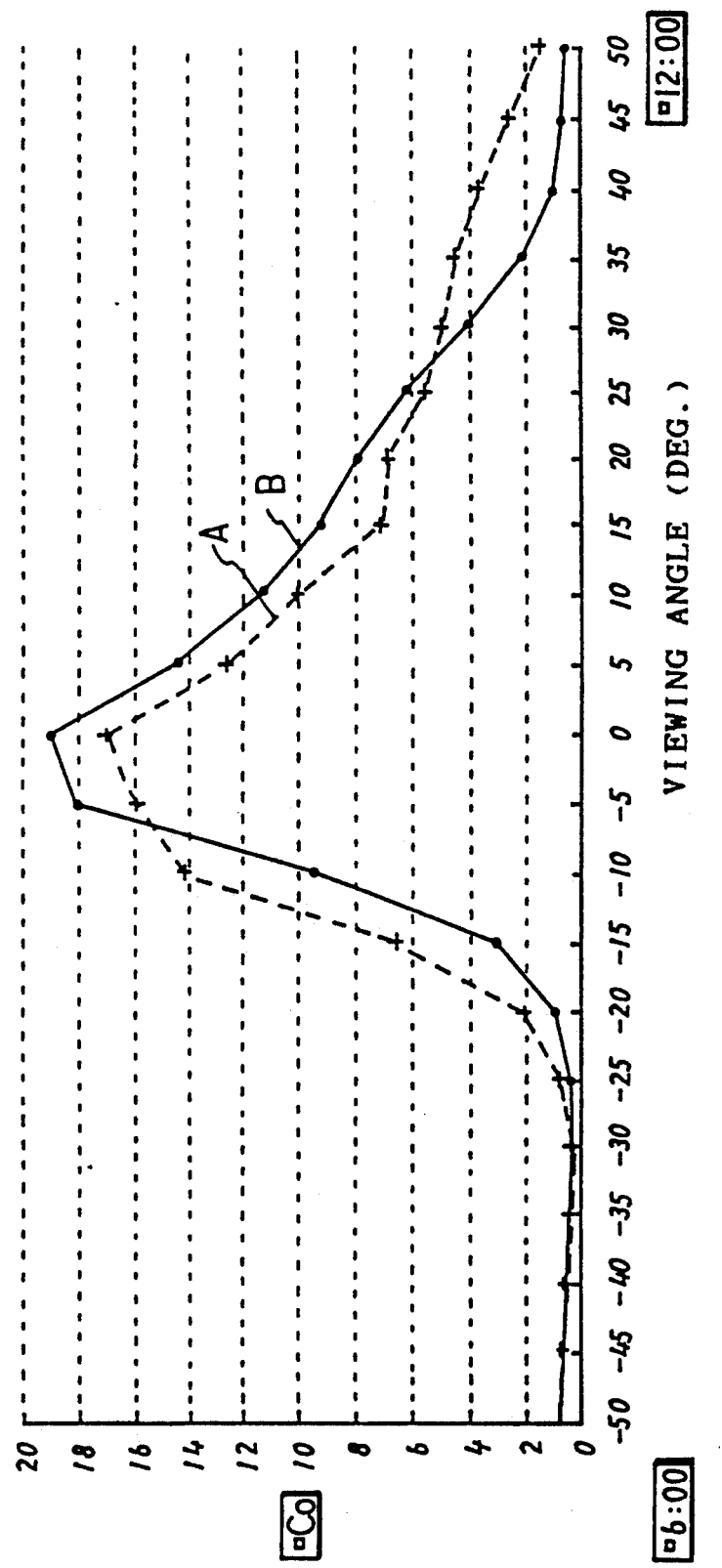

FIG. 10 is an exploded sectional view of a liquid crystal display device in a different embodiment of the invention. Numerals 3, 13 are polarizers of neutral gray type with the independent transmittance of 42% and degree of polarization of 99.99%, 9 is the front side of optical compensation plate comprising a laminate structure of a polystyrene phase difference plate 9a with the retardation value of 210 nm and a polycarbonate phase difference plate 9b with the retardation value of 210 nm, 10 is the back side of optical compensation plate comprising a laminate structure of a polycarbonate phase difference plate 10a with the retardation value of 210 nm and a polystyrene phase difference plate 10b with the retardation value of 210 nm. Numerals 1, 7 are glass substrates, on which transparent electrodes (ITO) 2, 6 are formed thereon. Furthermore organic orientation films 3, 5 are formed thereon, and rubbing orientation is treated so that a liquid crystal layer 4 may be twisted by 240 degrees. As the liquid crystal material for the liquid crystal layer 4, a nematic liquid crystal having a positive dielectric anisotropy is used, for example, a mixed liquid crystal adding 1.45 wt. % of cholesterylnonanoate (CN) as chiral dopant to define the twisting direction to phenylcyclohexane (PCH) liquid crystal. The refractive anisotropy of the mixed liquid crystal Δn is 0.123, and the thickness of the liquid crystal layer 4 is set at 7.5 μm. FIG. 8 shows the orientation condition of members of this embodiment. In the diagram, P8 is the absorption axis direction of the face side polarizer, P9 is the slow phase axis direction of the polystyrene phase difference plate 9a adjacent to the polarizer 8 and the polycarbonate phase difference plate 9b, and P3, P5 are liquid crystal molecule orientation axis (rubbing axis) of the upper side glass substrate and lower side glass substrate, being twisted by 240 degrees in the clockwise direction. Moreover, P10 is the slow phase axis direction of the polycarbonate phase difference plate 10a adjacent to the lower side glass substrate 7, and the polystyrene phase difference plate 10b, and P11 is the absorption axis direction of the lower side polarizer 13. FIG. 11 is a viewing angle-contrast characteristic diagram as seen on the flat plane including the 12 o'clock-6 o'clock direction of this embodiment and the prior art. Characteristic curve A denotes this embodiment, and characteristic curve B represents the prior art. When compared in the viewing angle range in which the contrast ratio Co is 4.0 or more, it is 44 degrees in the prior art and 57 degrees in this embodiment, being extended about 1.3 times. The prior art refers to a configuration of polycarbonate phase difference plates with the retardation value of 210 nm in 9a, 9b, 10a, 10c in FIG. 10.

Embodiment 4

Figure 12:
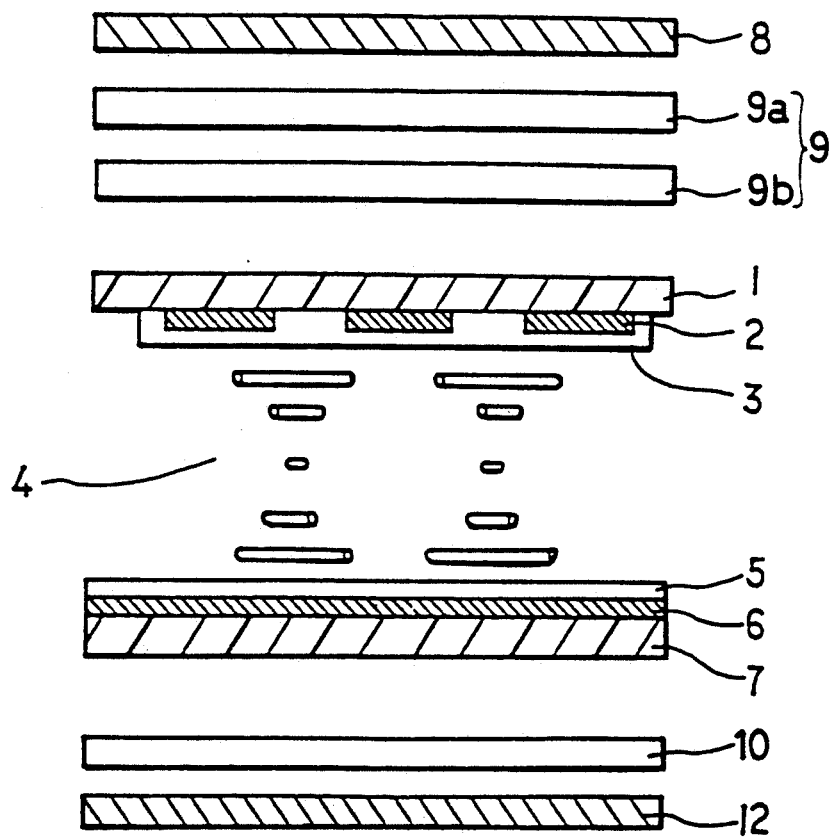

FIG. 12 is an exploded sectional view of a liquid crystal display device of a further difference embodiment of the invention. Numerals 8, 12 are polarizers of neutral gray type with the independent transmittance of 42% and degree of polarization of 99.99%, 9 is the front side of the optical compensation plate comprising a laminate structure of a polycarbonate phase difference plate 9a with the retardation value of 210 nm and a polystyrene phase difference plate 9b with the retardation value of 210 nm, 10 is the back side of the optical compensation pate comprising a polycarbonate phase difference plate with the retardation value of 420 nm. Numerals 1, 7 are glass substrates, and transparent electrodes (ITO) 2, 6 are formed thereon. Furthermore, organic orientation films 3, 5 are formed thereon, and rubbing orientation is treated so that a liquid crystal layer 4 may be twisted by 240 degrees. As the liquid crystal material for the liquid crystal layer 4, a nematic liquid crystal having a positive dielectric anisotropy is used, for example, a mixed liquid crystal adding 1.45 wt. % of cholesterylnonanoate (CN) as chiral dopant to define the twisting direction to phenylcyclohexane (PCH) liquid crystal. The refractive anisotropy $\Delta n$ of the mixed liquid crystal is 0.123, and the thickness of the liquid crystal layer 4 is set at 7.5 $\mu$m. FIG. 13 shows the orientation condition of the members of this embodiment. In the diagram, P8 denotes the absorption axis direction of face side polarizer, P9 is the slow phase axis direction of the polycarbonate phase difference plate 9a adjacent to the face side polarizer 8, P10 is the slow phase axis direction of the polystyrene phase difference plate 9b adjacent to the polycarbonate phase difference plate 9a, and P3, P5 are the liquid crystal molecule orientation axis (rubbing axis) of the upper side glass substrate 1 and lower side glass substrate 7, being twisted by 240 degrees in the clockwise direction. More over, P11 is the slow phase axis direction of the polycarbonate phase difference plate 10 adjacent to the lower side glass substrate and P12 is the absorption axis direction of the lower side polarizer 12. FIG. 14 is a viewing angle-contrast characteristic diagram as seen on the flat plane including the 9 o'clock-3 o'clock direction of this embodiment and the prior art. Characteristic curve A denotes this embodiment, and characteristic curve B represents the prior art. When compared in a viewing angle range in which the contrast ratio Co is 4.0 or more, it is 59 degrees in the prior art and 78 degrees in this embodiment, being extended by about 1.2 times. The prior art is a configuration of polycarbonate phase difference plates, having the retardation value of 9a, 9b of 210 nm and the retardation value of 10 of 420 nm in FIG. 12.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which comes within the meaning and the range of equivalency of the claims are therefore intended to be embraced therein.

What is claimed is:

1. A liquid crystal display device composed by disposing optical compensation plates on the front and back sides of a liquid crystal cell having a liquid crystal layer oriented by supertwisting, wherein one of the optical compensation plates is a phase difference plate of uniaxially drawn polymer film made of polycarbonate having an optical axis parallel to the surface thereof, and the other is a phase difference plate of uniaxially drawn polymer film made of polystyrene having an optical axis parallel to the surface thereof.

2. A liquid crystal display device of claim 1, wherein the front side of the liquid crystal is a phase difference plate of uniaxially drawn polymer film made of polycarbonate and the back side is a phase difference-plate of uniaxially drawn polymer film made of polystyrene.

3. A liquid crystal display device of claim 1, wherein the front side of the liquid crystal is a phase difference plate of uniaxially drawn polymer film made of polystyrene and the back side is a phase difference plate of uniaxially drawn polymer film made of polycarbonate.

4. A liquid crystal display device composed by disposing optical compensation plates on at least one of the front side and back side of a liquid crystal cell having a liquid crystal layer oriented by supertwisting, wherein at least one of the optical compensation plates is a laminate structure of a phase difference plate of uniaxially drawn polymer film made of polycarbonate having an optical axis parallel to the surface thereof and a phase difference plate of uniaxially drawn polymer film made of polystyrene having an optical axis parallel to the surface thereof.

5. A liquid crystal display device of claim 4, wherein each of the front side and back side of the liquid crystal is a laminate structure of a phase difference plate of uniaxially drawn polymer film made of polycarbonate and a phase difference plate of uniaxially drawn polymer film made of polystyrene.

6. A liquid crystal display device of claim 4, wherein the front side of the liquid crystal is a laminate structure of a phase difference plate of uniaxially drawn polymer film made of polycarbonate and a phase difference plate of uniaxially drawn polymer film made of polystyrene, and the back side is a phase difference plate of uniaxially drawn polymer film made of polycarbonate.

7. A liquid crystal display device of claim 4, wherein the front side of the liquid crystal is a laminate structure of a phase difference plate of uniaxially drawn film made of polycarbonate and a phase difference plate of uniaxially drawn polymer film made of polystyrene, and the back side is a phase difference plate of uniaxially drawn polymer film made of polystyrene.

* * * * *